United States Patent
Gross (10) Patent No.: US 9,822,897 B2
(45) Date of Patent: Nov. 21, 2017

(54) ONE-WAY VALVE CAP

(71) Applicant: Matthew Gross, Alta Loma, CA (US)

(72) Inventor: Matthew Gross, Alta Loma, CA (US)

(*) Notice: Subject to any disclaimer, the term of this patent is extended or adjusted under 35 U.S.C. 154(b) by 19 days.

(21) Appl. No.: 15/074,948

(22) Filed: Mar. 18, 2016

(65) Prior Publication Data

US 2017/0268684 A1 Sep. 21, 2017

(51) Int. Cl.
| F16K 35/00 | (2006.01) |
| F16K 27/12 | (2006.01) |
| F16K 15/00 | (2006.01) |
| F16K 35/06 | (2006.01) |

(52) U.S. Cl.
CPC .............. *F16K 27/12* (2013.01); *F16K 15/00* (2013.01); *F16K 35/00* (2013.01); *F16K 35/06* (2013.01); *Y10T 70/5571* (2015.04); *Y10T 70/5615* (2015.04); *Y10T 70/5619* (2015.04); *Y10T 70/5624* (2015.04); *Y10T 137/7062* (2015.04); *Y10T 137/7069* (2015.04); *Y10T 137/7256* (2015.04)

(58) Field of Classification Search
CPC ......... Y10T 137/7062; Y10T 137/7069; Y10T 137/7256; Y10T 70/5571; Y10T 70/5615; Y10T 70/5619; Y10T 70/5624
USPC ........................................................ 220/210
See application file for complete search history.

(56) References Cited

U.S. PATENT DOCUMENTS

| 445,755 | A | 2/1891 | King |
| 738,917 | A | 9/1903 | Kempien |
| 2,138,871 | A | 12/1938 | Malluk |
| 2,381,207 | A | 8/1945 | Coleman |
| 2,772,803 | A | 12/1956 | Pasquariello |
| 3,426,932 | A | 2/1969 | Rouse |
| 3,582,169 | A | 6/1971 | Koenig |
| 4,014,449 | A | 3/1977 | Hadley et al. |
| 4,453,388 | A * | 6/1984 | Baker ................ B60K 15/0409 220/210 |
| 4,690,292 | A | 9/1987 | Henning |
| 4,796,769 | A | 1/1989 | Stuckey |
| 4,984,698 | A | 1/1991 | Stuckey |
| 5,170,900 | A | 12/1992 | Manera |
| 5,212,971 | A * | 5/1993 | Yoon ................ B60K 15/0409 220/210 |
| 5,467,621 | A * | 11/1995 | Gravino ............. B60K 15/0409 220/86.2 |
| 5,586,670 | A | 12/1996 | Greenwald |

(Continued)

*Primary Examiner* — Kevin Murphy
(74) *Attorney, Agent, or Firm* — Kirk A. Buhler; Buhler & Associates (57) ABSTRACT

Improvements in a one-way valve cap to allow a homeowner to install the cap without requiring tools. This allows a homeowner to simply remove the existing cap and install the new cap to prevent removal from an unauthorized person. The one-way locking mechanism includes a ramp that prevents a person from unscrewing to cap without a tool. The opening allows a person to insert the tool through the outer housing and into the inner housing to unscrew the inner housing from the valve. A hex key or a custom key design can be used for removing the cap. A seal is inserted in the inner housing and seals the inner housing with the valve. The elastomeric seal prevents intrusion of contamination inside of the valve and also provides an additional seal to the valve to reduce a potential leak of gas from the line.

12 Claims, 6 Drawing Sheets

(56) References Cited

U.S. PATENT DOCUMENTS

| | | | |
|---|---|---|---|
| 5,649,437 A * | 7/1997 | Royka, Jr. | ............ E03B 9/06 |
| | | | 137/382 |
| 5,769,252 A | 6/1998 | Volpe | |
| 5,873,475 A | 2/1999 | Volpe | |
| 6,032,811 A | 3/2000 | Marconi | |
| 6,082,564 A | 7/2000 | Trout | |
| 6,223,923 B1 * | 5/2001 | Fishman | ............ B60K 15/0409 |
| | | | 220/203.22 |
| 6,612,455 B2 * | 9/2003 | Byrne | ............ B65D 50/068 |
| | | | 215/207 |
| 8,905,060 B2 | 12/2014 | Schlesinger et al. | |

* cited by examiner

ONE-WAY VALVE CAP

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a Valve Cap. More particularly, the present One-Way Valve Cap allows a person without tools to install the valve cap, but requires a tool to remove the valve cap.

Description of Related Art Including Information Disclosed Under 37 CFR 1.97 and 1.98

Generally, a cap for a valve provides protection from the cap from contamination that can enter the valve, threads or other parts of the valve. The cap is usually threaded onto the valve at the factory and can easily be removed by manually unthreading the cap with the hands of a home owner or a technician. Because this valve cap can be easily removed or installed, it also makes the cap venerable from a person that is venting the valve as vandalism or from inhaling the gas. There have been some devices that require the installation and or removal of the cap with a specialized tool. There are two problems with the approach. The first problem is that a specialized tool is required to install the cap and the second problem is that this eliminates the ability of a home owner to install the cap.

A number of patents and or publications have been made to address the keeping the valve protected from unauthorized people. Many of these solutions require that the parts are fabricated from metal components and further require specialized keys that need to be purchased or can easily be lost. Exemplary examples of patents and or publication that try to address this/these problem(s) are identified and discussed below in the cited patents.

U.S. Pat. No. 5,873,475 issued on Feb. 23, 1999 to Anthony S. Volpe discloses a Container closure which converts from a child resistant to a non-child resistant configuration. The container closure can be converted from a child resistant configuration to a non-child resistant configuration. The container closure includes an external cap, an internal cap and a locking element. The locking element is inserted between the external cap and internal cap to form the non-child resistant configuration. This cap requires a specialized key for both insertion and removal and if the key is lost then the owner is no longer able to open the closure.

U.S. Pat. No. 6,612,455 issued on Sep. 2, 2003 to Joseph M. Byrne discloses a Cap Lock Assembly and System. In this patent the cap lock system restricts access to a threaded cylindrical end of an access or security device, such as a Schrader valve. An inner lock has a threaded cavity which screws onto an externally-threaded cylindrical end of the Schrader valve. While this patent provides a cap lock the cap lock requires to tool to both install and remove.

U.S. Pat. No. 8,905,060 issued on Dec. 9, 2014 to Larry Schlesinger et al., and discloses a tamper-resistant caps, assemblies and systems for use with a valve. The tamper-proof cap systems and methods use an access valve, such as a refrigeration access valve. The tamper-proof cap assembly is for use with an access valve that can include a cylindrical outer cap and a cylindrical inner cap, wherein the inner cap captivity resides within and rotates freely within the outer cap. While this prevents undesirable removal of the cap, it can require destructive removal of the inner and outer components to gain access to the valve.

What is needed is a one-way valve cap that provides protection to the valve, can be installed by a non-technician without a tool, requires a tool for removal and is cost effective to allow for an easy replacement that can be placed on every valve without special tools.

BRIEF SUMMARY OF THE INVENTION

It is an object of the one-way valve cap to allow a homeowner to install the cap without requiring any tools. This allows a homeowner to simply remove the existing cap and install the new cap to prevent removal from an unauthorized person.

It is an object of the one-way valve cap to have a one-way locking tab that an installer must press-down to engage the one-way mechanism that only allows clockwise rotation of the inner cap. The one-way locking mechanism includes a ramp that prevents a person from unscrewing the cap from the valve without the use of a tool.

It is an object of the one-way valve cap to have a top housing with an opening for insertion of a tool. The opening allows a person to insert the tool through the outer housing and into the inner housing to unscrew the inner housing from the valve. The tool can be a common hex key or can be a custom key design to allow or prevent a homeowner from removing the cap.

It is an object of the one-way valve cap to include an elastomeric seal. The elastomeric seal is inserted in the inner housing and seals the inner housing with the top of the valve. The elastomeric seal is essentially an O-ring or a torus gasket. This prevents intrusion of contamination inside of the valve and also provides an additional seal to the valve to reduce a potential leak of gas from the line.

It is another object of the one-way valve cap to be fabricate from as few as two pieces that are inserted together to form a single using the parts have one-way tapered edges that prevent the parts from being separated once they are assembled together. One or more sets of surface prevent the separation of the two parts once they are engaged and retained together. The parts can further be an assembly of parts that are glued together and required that the parts be cut apart to remove them from the valve.

It is still another object of the one-way valve cap for the parts to be fabricated from a molding operation. The molding process allows for a cost effective manufacturing process where the parts can be produced in high volume to make the one-way valve cap more easily purchased by homeowners, original equipment manufacturers, installers and service personnel.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
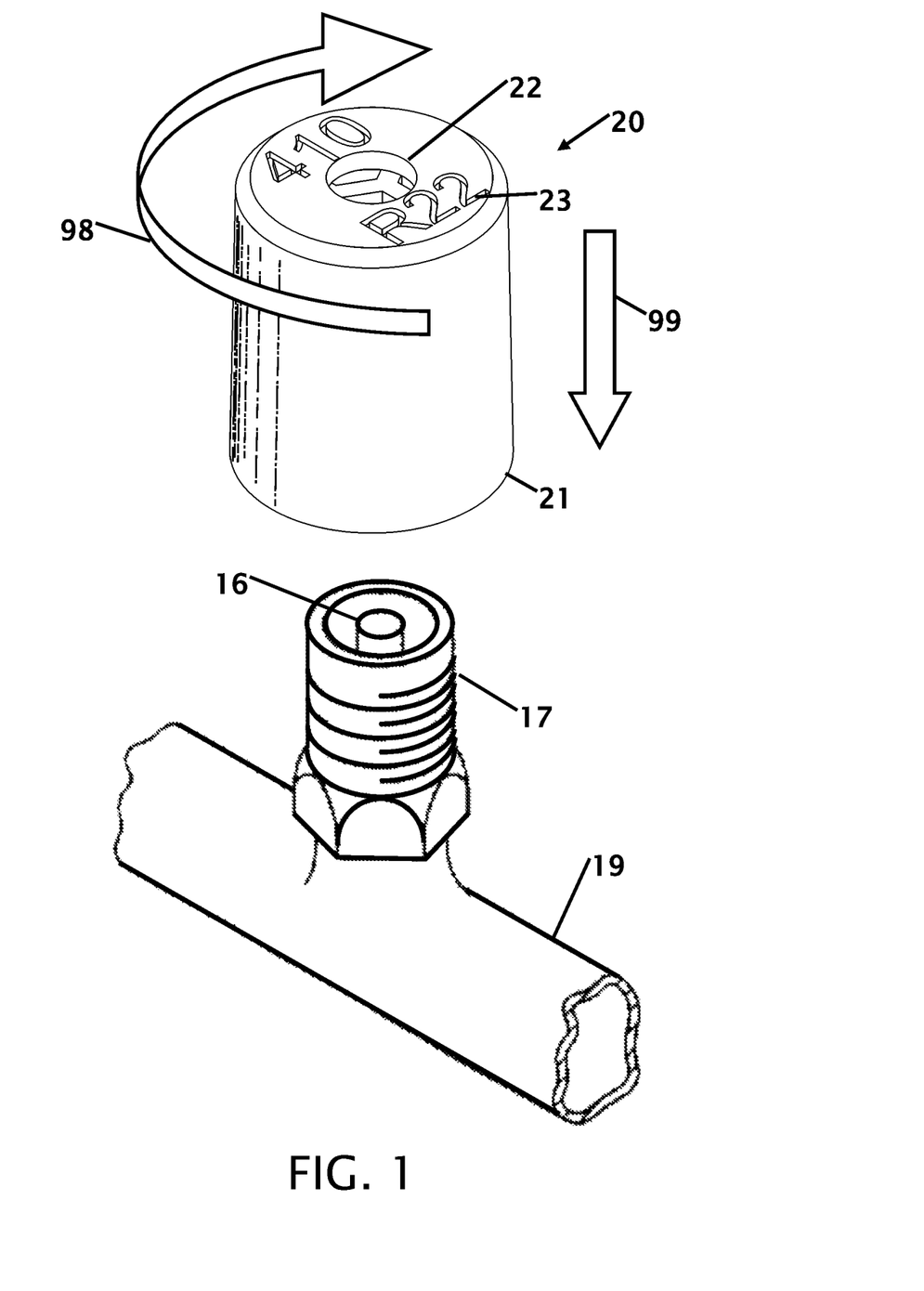
FIG. 1 shows a one-way valve cap being installed on a valve.

FIG. 1 shows a one-way valve cap 20 being installed on a valve. In this preferred embodiment the valve cap 20 is shown above the valve. With the valve exposed, a person could press on the valve stem 16 to vent gas from the valve into the atmosphere or out from the pressurized line 19. When the valve is being filled, the filling chamber is threaded 17 onto the valve and the stem 16 is depressed to transfer the gas from the filling chamber to fill the pressurized line 19.

The cap is placed 99 onto the valve and turned 98 onto the threaded area 17 of the valve. Turning 98 the cap clockwise engages the cap 20 onto the valve. A one-way mechanism engages between an inner and outer portion of the cap to only allow for the cap to be secured when turned clock-wise, but spins when turned counter clock-wise. A tool is inserted through the opening in the outer housing 22 to engage into an inner housing to unscrew the cap from the threads 17 of the valve. This figure further shows one contemplated embodiment of the indicia 23 that identifies some options for the gas in the pressurized line 19. On this cap are indicia indicating 410 gas and R22 gas options that can be in the pressurized line 19.

Figure 2:
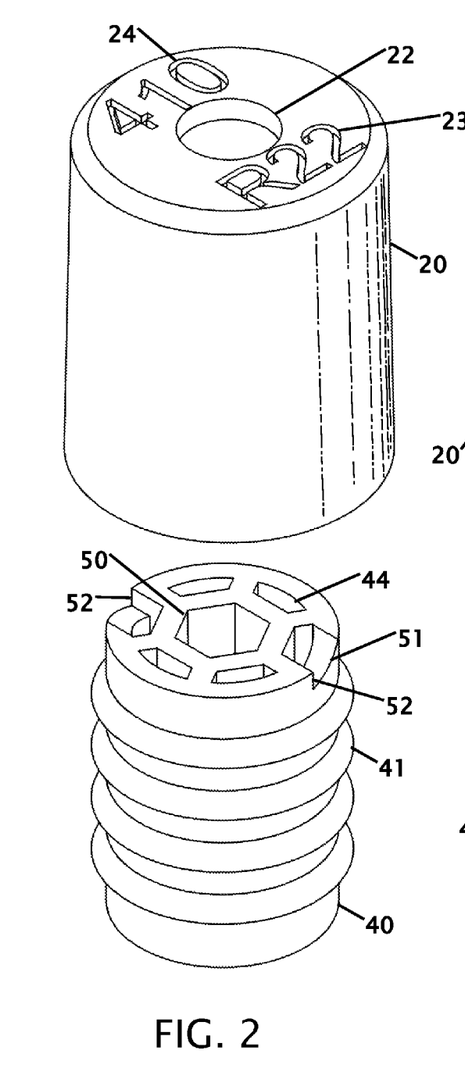
FIG. 2 shows a top exploded perspective view of the one-way valve cap.
Figure 3:
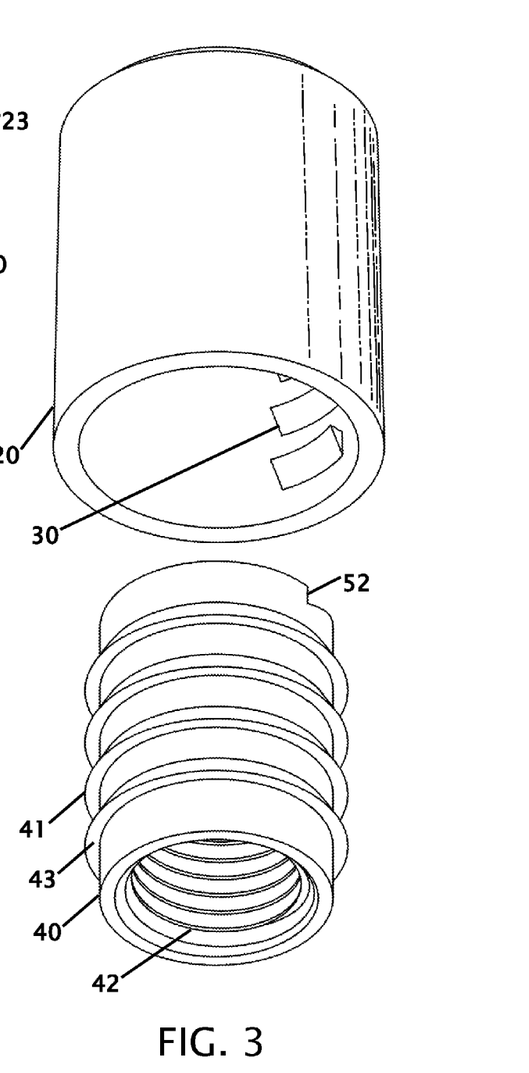
FIG. 3 shows a bottom exploded view of the one-way valve cap.

FIG. 2 shows a top exploded perspective view of the one-way valve cap and FIG. 3 shows a bottom exploded view of the one-way valve cap. The two parts of the one-way valve cap are shown as an outer cap 20 and an inner cap 40. The inner cap 40 has a plurality of tapered catches 41 with a taper on one side and a flat area or ledge 43 on the other side. In this embodiment there are four catches, but a few as one to more than four are contemplated.

The interior of one end of the one-way valve cap is a tapped hole. Typically, this is a 5/16-20 tapped hole 42, but other thread types are contemplated that match the thread of the valve. The other end of the one-way valve cap is configured to accept a hex key 50. The hex key in this embodiment is a 3/16, but other sizes are contemplated including, but not limited to, blade, Philips, star, torx, or custom torsion key type or tool that allows for bi-directional turning of the inner cap. Lightening holes 44 provide a consistent wall thickness to the plastic cart to make fabrication from injection molding easier. In addition to the recessed drive hole 50, the outer edge of the inner cap has at least one edge 52 with tapers 51 that engage in complementary one-way notches in the outer cap, not shown in these figures.

The outer cap 20 shows the complementary outer housing capture ramps 30 that capture the tapered catches 41 and prevents the inner cap 40 from being removed from the outer cap 20 once they have been inserted together. The top of the outer cap 20 has a clearance hole 22 where the drive tool is inserted through the clearance hole 22 to remove the inner cap 40 from a valve stem shown in FIG. 1. Indicia(s) 23 and 24 on the top of the outer cap 20 identifies the types if gas that can be in the pressurized line covered by the cap.

Figure 4:
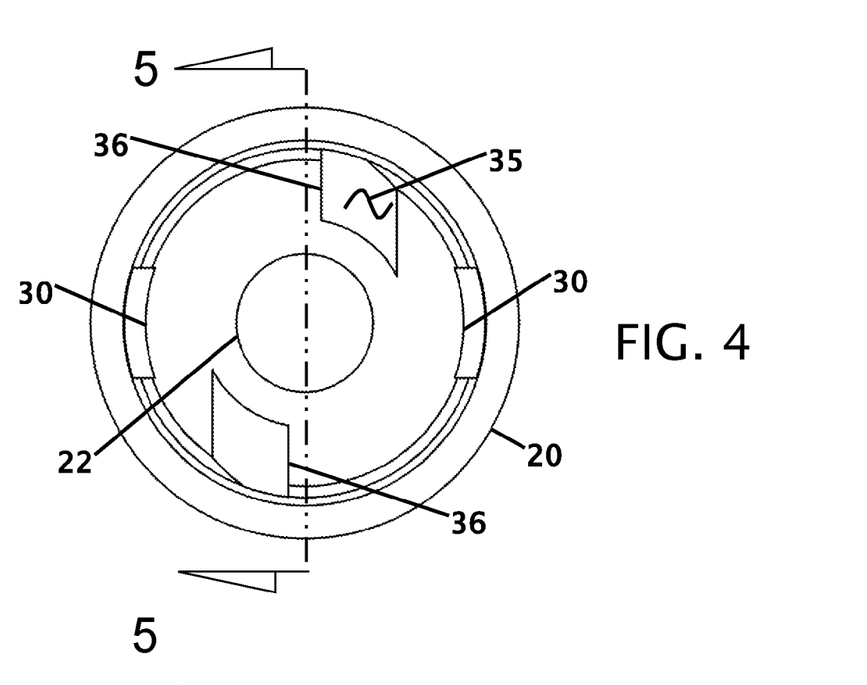
FIG. 4 is an inside view of the outer cap housing.
Figure 5:
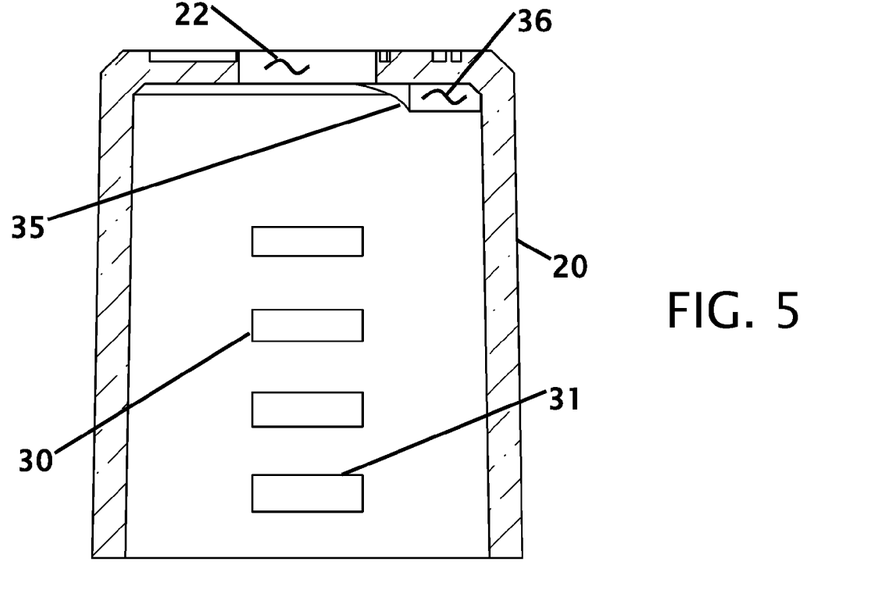
FIG. 5 is a cross-sectional view of the outer cap cut through section 5-5 of FIG. 4.

FIG. 4 is an inside view of the outer cap housing and FIG. 5 is a cross-sectional view of the outer cap cut through section 5-5 of FIG. 4. These figures show the outer one-way capture ramps 35 with the vertical wall 36 that creates the one-way lock so the outer cap 20 can be pressed down and turned clock-wise to thread the inner cap onto a valve, but when turned counter-clockwise the ramps 35 prevent sufficient engagement to remove the cap from the valve. The outer housing capture ramps 30 are shown with the ramp area 30 and the top lock 31 area. The top hole clearance hole 22 is shown passing through the top of the housing.

Figure 6:
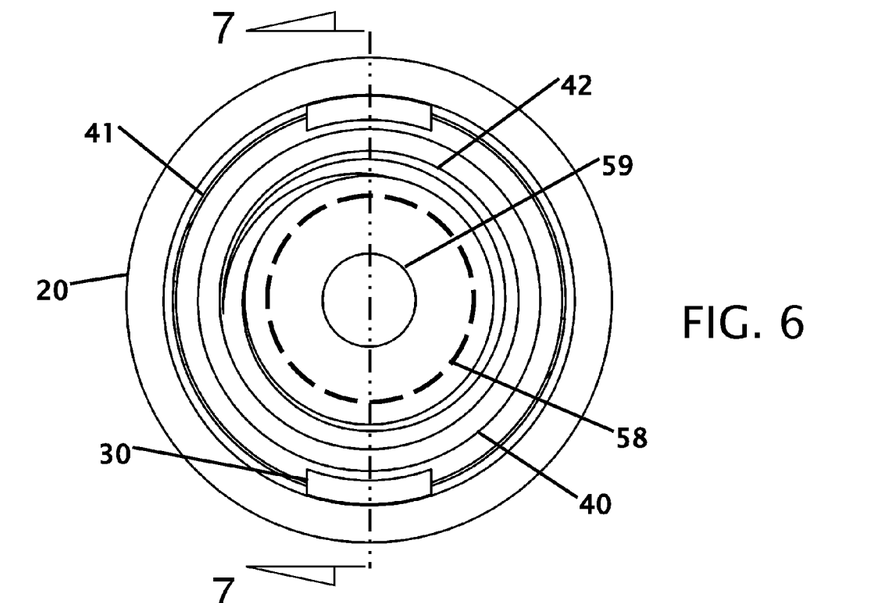
FIG. 6 is a bottom view of the one-way valve cap.
Figure 7:
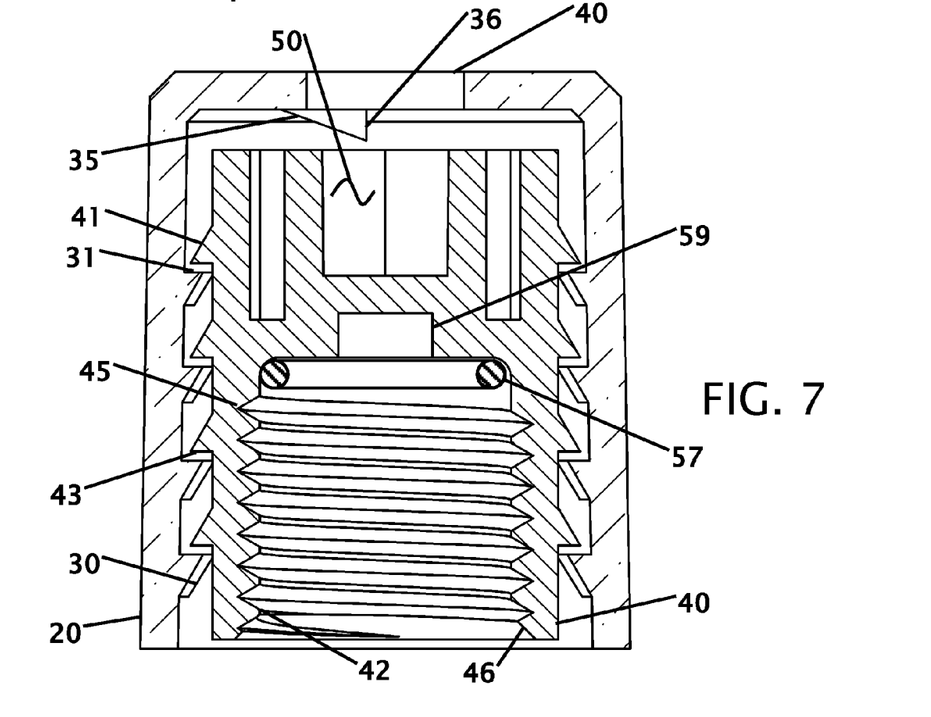
FIG. 7 is a cross-sectional view of the valve cap cut through section 7-7 of FIG. 6.
Figure 8:
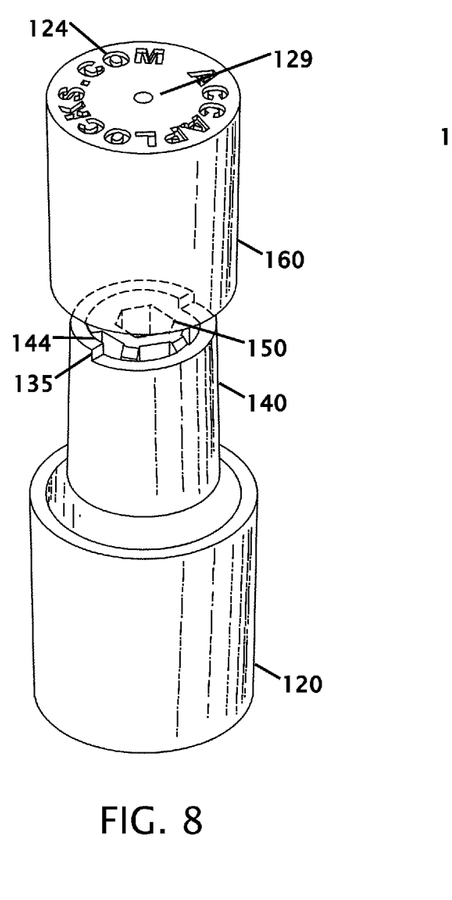
FIG. 8 shows a top exploded perspective view of a second embodiment of a one-way valve cap.
Figure 9:
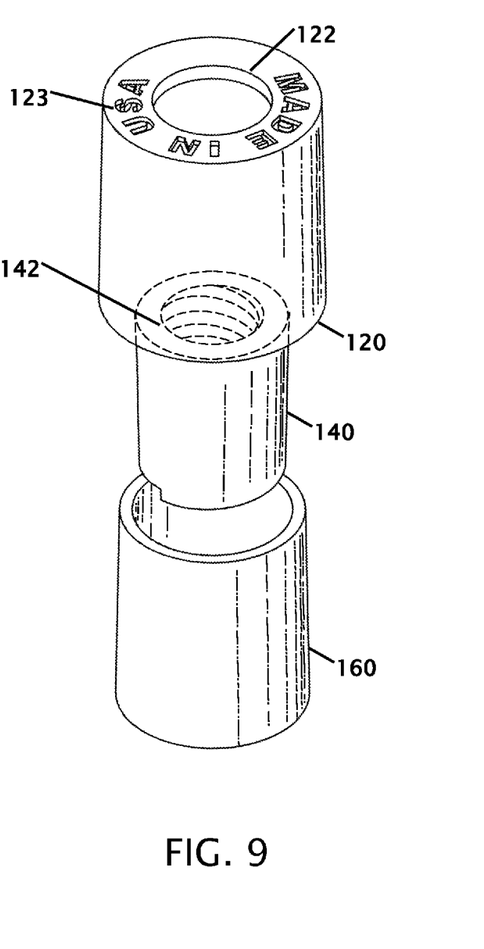
FIG. 9 shows a bottom exploded view of a second embodiment of a one-way valve cap.

FIG. 6 is a bottom view of the one-way valve cap and FIG. 7 is a cross-sectional view of the valve cap cut through section 7-7 of FIG. 6. From these figures the engagement of the inner cap 40 within the outer cap 20 is visible. A gasket 57 is shown to seal the valve within the one-way valve cap 40. A relief 59 provides clearance for a relief stem of the valve. The outer cap 20 one-way ramp 35 is shown with some clearance from the top of the inner cap 40. The distance between the locking edges 43 allows the inner cap 40 to float in the outer cap 20 to engage and slip from the one-way ramp(s) 35. In this embodiment two one-way ramps 35 are shown, but as few as one to more than two are contemplated FIG. 8 shows a top exploded perspective view of a second embodiment of a one-way valve cap and FIG. 9 shows a bottom exploded view of a second embodiment of a one-way valve cap. The three parts of the one-way valve cap are shown as an outer cap 120, middle cap 160 and an inner cap 140. The middle cap 160 is bonded to the outer cap 120. The middle cap 160 is captured, glued, heat staked or bonded between the outer cap 120 and the middle cap 160. The outer cap 120 and the middle cap 160 capture, float or suspend the inner cap 140.

The interior of one end of the inner cap 140 is a tapped hole 142. Typically, this is a 5/16-20 tapped hole 142, but other thread types are contemplated that match the thread of the valve. The other end of the one-way valve cap is configured to accept a hex key 150 opening. The hex key 150 opening is under an outer wall 129 of the middle housing 160 that can be removed when the middle housing 160 is molded or before it is assembled. This allows the part to be easily installed, but require a drill to open the passage to access the hex key opening. It is also contemplated that the outer wall 129 can be drilled with the "V" hole to provide a future opening to use the hex key 150 opening. The hex key in this embodiment is a 3/16, but other sizes are contemplated including, but not limited to, blade, Philips, star, torx, or custom key type. Lightening holes 144 provide a consistent wall thickness to the plastic cart to make fabrication from injection molding easier and provide some reduction in the amount of material that is used to produce the inner housing 140.

The top of the outer cap 120 has a clearance hole 122 where the valve stem passes through the clearance hole 122 to remove the cap from a valve stem. Indicia(s) 123 and 124 on the outer ends of the caps identifies information such as, but not limited to, advertising, gas in a line, country of origin, material etc.

Figures 10, 11:
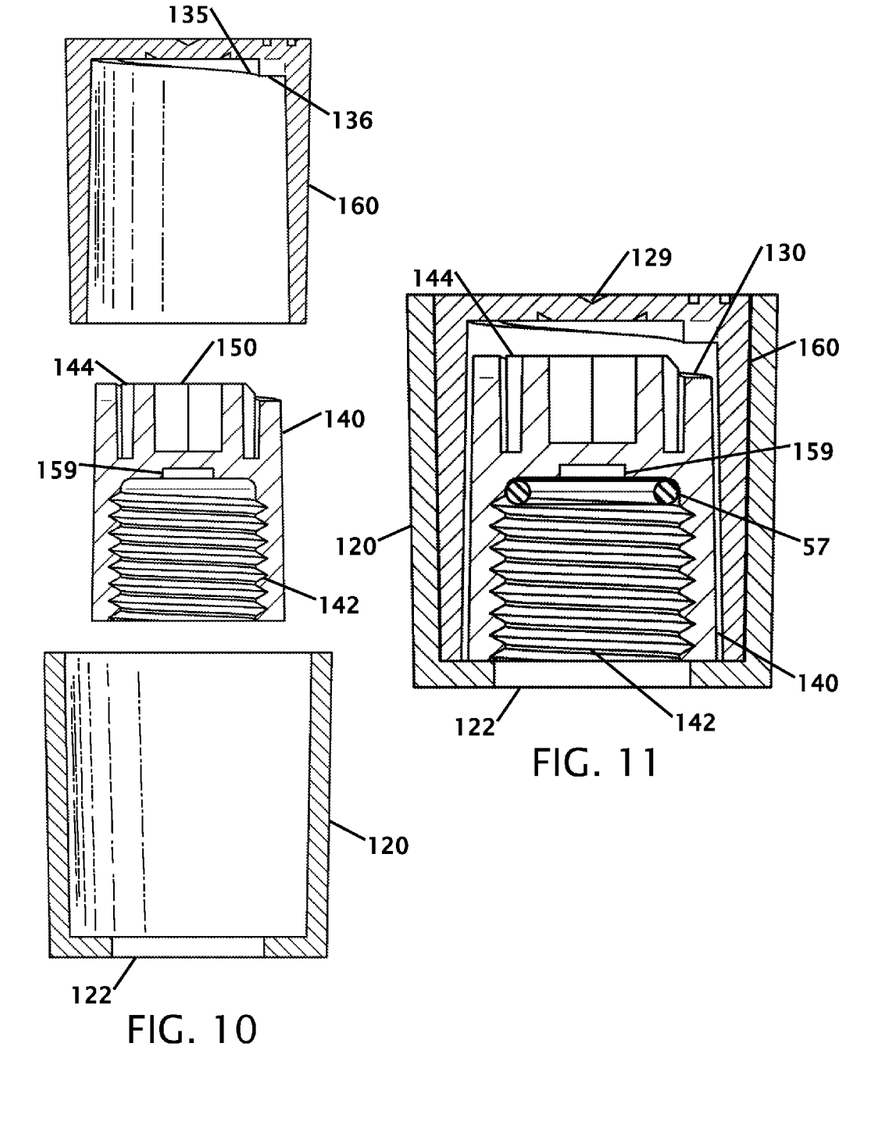
FIG. 10 is a cross-sectional view of the exploded view of this embodiment.
FIG. 11 is a cross-sectional view of this assembled embodiment.

FIG. 10 is a cross-sectional view of the exploded view of this embodiment. This figure show the parts fully engaged and FIG. 11 is a cross-sectional view of this assembled embodiment. These figures show the middle housing 160 one-way capture ramps 135 with the vertical wall 136 that creates the one-way lock so the middle cap 160 can be pressed down and turned clock-wise to thread the inner cap 140 onto a valve, but when turned counter-clockwise the ramps 135 prevent sufficient engagement to remove the cap from the valve. The inner housing 140 capture ramps 130 are shown with the ramp area 130 and the top lock 131 area.

From these figures the engagement of the inner cap 140 within the assembly of the middle and outer caps is visible. A gasket 57 is shown to seal the valve within the inner cap 140. A relief 159 provides clearance for a relief stem of the valve. The distance between the locking edges 136 and 131 allows the inner cap 140 to float in the assembly of the middle and outer caps to engage and slip from the one-way ramp(s) 130/135. In this embodiment two one-way ramps 130/135 and stops 131/136 are shown, but as few as one to more than two are contemplated. The opening for the hex key 150 is shown between the one-way ramps 130 in the inner housing 140 with clearance holes 144 to maintain a constant wall thickness in the part.

Thus, specific embodiments of a one-way valve cap have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A one-way valve cap comprising:
    an inner cap having a longitudinal axis;
    an elongated middle cap;
    an elongated outer cap;
    said inner cap being loosely captured between said elongated middle cap and said elongated outer cap;
    said inner cap having a first end with an internally threaded hole sized for threading on external threads of a valve stem;
    said inner cap having a second end with an opening for accepting a torsion tool;
    said second end of said inner cap having a circular end with at least one one-way tapered ramp with a first wall that extends axially into said circular end in a direction parallel to said longitudinal axis;
    said outer cap having a complementary one-way tapered ramp with a second wall that engages in said at least one-way tapered ramp with said first wall of said inner cap whereby said first and second walls provide threading of said inner cap internally threaded hole onto said external threads of said valve stem, and
    said complementary one-way tapered ramp of said outer cap and said one-way tapered ramp of said inner cap prevents unthreading of said inner cap internally threaded hole.

2. The one-way valve cap according to claim 1 wherein said inner cap is loosely suspended completely within said elongated middle cap and said elongated outer cap.

3. The one-way valve cap according to claim 1 wherein said elongated middle cap is plastic.

4. The one-way valve cap according to claim 1 wherein said elongated outer cap is plastic.

5. The one-way valve cap according to claim 1 wherein said inner cap is plastic.

6. The one-way valve cap according to claim 1 further includes an elastomeric seal in said inner cap.

7. The one-way valve cap according to claim 1 wherein said torsion tool is selected from a group consisting of a hex key, a blade driver, a Philips driver, a star driver, a torx driver or a key shaped driver.

8. The one-way valve cap according to claim 1 wherein said elongated outer cap has a clearance hole that is larger than a diameter of said torsion tool.

9. The one-way valve cap according to claim 1 wherein said elongated outer cap is drilled to clear a clearance hole for insertion of said torsion tool.

10. The one-way valve cap according to claim 1 further includes a clearance of said inner cap within said elongated outer cap whereby said inner cap rotates and translates within said elongated outer cap.

11. The one-way valve cap according to claim 1 wherein an inner diameter of said elongated middle cap is secured to an outside diameter of said elongated outer cap.

12. The one-way valve cap according to claim 11 wherein said inner diameter of said elongated middle cap is drafted to engage with a drafted elongated outside diameter of said elongated outer cap.

* * * * *